United States Patent [19]
Hemmings

[11] 3,761,108
[45] Sept. 25, 1973

[54] MOTOR VEHICLE BODIES
[75] Inventor: Keith Reginald Hemmings, Adlington, England
[73] Assignee: British Leyland Truck and Bus Division Limited, Lancashire, England
[22] Filed: Aug. 31, 1971
[21] Appl. No.: 176,513

[30] Foreign Application Priority Data
Oct. 9, 1970 Great Britain.................43454/70

[52] U.S. Cl. ........................ 280/106.5 R, 296/28 R
[51] Int. Cl............................................ B62d 23/00
[58] Field of Search ............ 246/28 R, 28 F, 106.5, 246/106

[56] References Cited
UNITED STATES PATENTS
3,528,699  9/1970  Wessells........................... 296/28 R
3,103,380  9/1963  Berger.............................. 296/28 R
3,617,087  11/1971 Hiramatsu ........................ 296/28 F Primary Examiner—Philip Goodman
Attorney—Harold T. Stowell et al.

[57] ABSTRACT

In an integral motor vehicle body the underframe is designed to transmit loads into the body sides, ie. the loads are not taken up entirely in the underframe.

6 Claims, 3 Drawing Figures

MOTOR VEHICLE BODIES

The present invention relates to motor vehicle bodies and more particularly to the mountings for the suspension of a motor vehicle.

According to the present invention in an integral motor vehicle body the underframe is designed to transmit loads into the body sides, ie. the loads are not taken up entirely in the underframe.

According to a first aspect of the present invention a vehicle suspension arrangement has the following combination of features:

a. an axle is connected to the sprung mass of a vehicle by two suspension elements; and
b. each of the two suspension elements is connected to a wheel arch of the vehicle body, the wheel arch being adapted to transmit suspension loads into the body sides of the vehicle.

According to a second feature of the invention the wheel arch comprises a web having a substantially vertical portion extending longitudinally of the vehicle and connected at its ends to two transverse frame members of the vehicle body.

According to a third feature of the invention the two substantially vertical portions are interconnected by a suspension mounting member at intermediate points along their lengths.

According to a fourth feature of the invention the web is connected to the transverse members by plate joints.

According to a fifth feature of the invention the wheel arch also includes a substantially horizontal portion which is non-load bearing.

According to a sixth feature of the invention each of the suspension elements comprises an air spring.

According to a seventh feature of the invention a transverse box sectioned member extends across the trailing ends of the wheel arches so that loads applied to the wheel arches by the front axle are transmitted by the box sectioned transverse member to the sides of the vehicle body.

According to an eighth feature of the invention two top-hat section frame members extend rearwardly from the box sectioned member, each of these members carrying a mounting for the trailing end of two leading suspension arms which have their front ends connected to the vehicle axle.

According to a ninth feature of the invention the motor vehicle has a rear suspension which includes a V-frame, the apex of which is pivotally connected to the transverse frame member which forms part of the underframe of the vehicle body, the said transverse member being of box section so as to transmit suspension loads into the sides of the vehicle body.

According to a tenth feature of the invention the mounting for the V-frame extends longitudinally of the vehicle and has its leading end connected to an intermediate point of the said transverse box section member of the underframe, and its trailing end connected to a further transverse member which itself is supported between two longitudinally extending frame members which have their leading ends connected to the transverse box section member.

How the invention may be carried out will now be described by way of example only and with reference to the accompanying drawings in which.

FIG. 1

Figure 1:
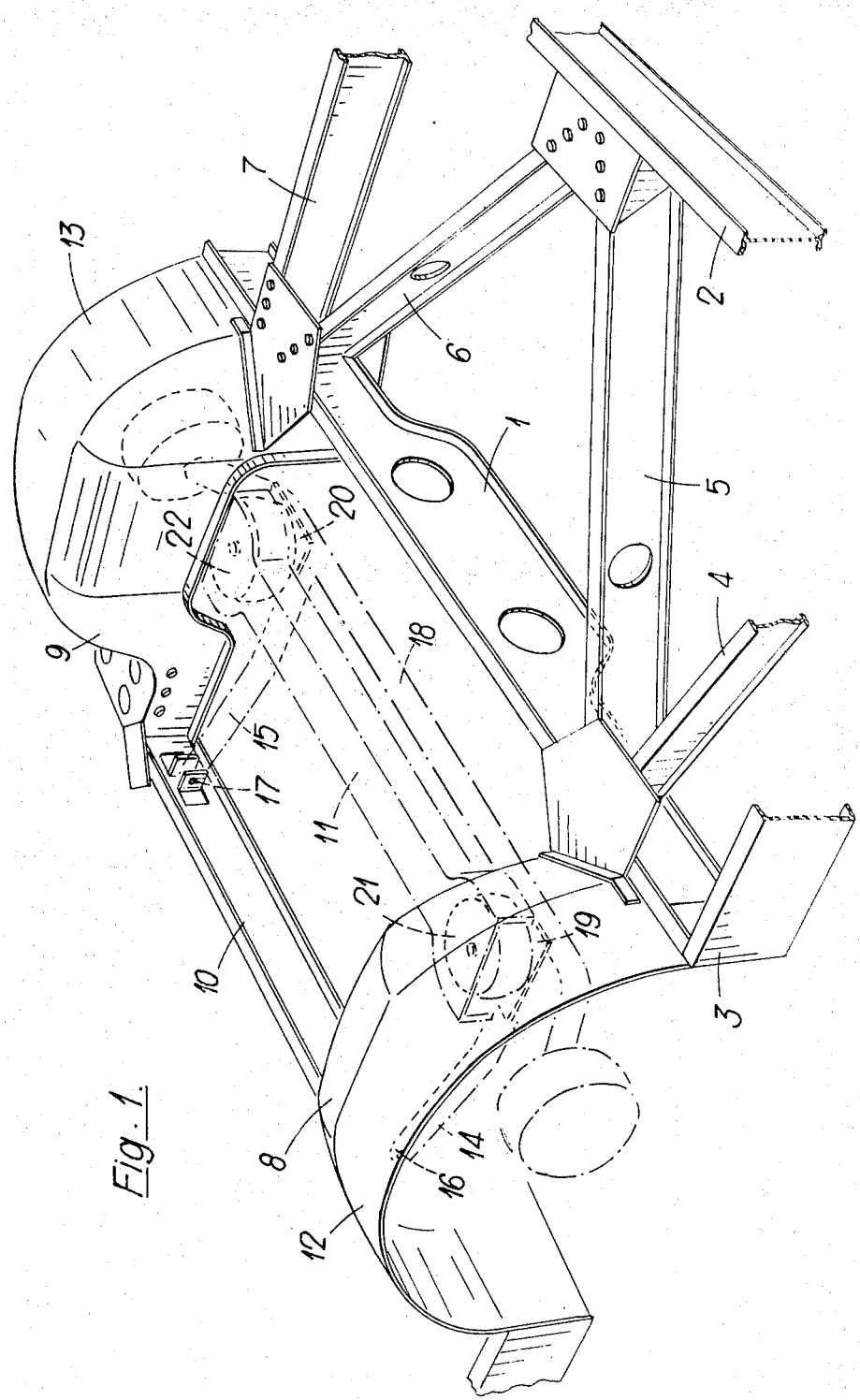
FIG. 1 is a fragmentary perspective view of part of one underframe constructed according to the present invention.

The underframe of a public service vehicle has a transverse frame member 1 which is a substantially I-shaped cross-section and which defines the leading edge of the front wheel arches of the vehicle.

The foremost transverse member 2 of the underframe is cantilevered from the transverse member 1 by generally longitudinally extending frame members 3 to 7 respectively.

The front wheel arches of the vehicle are formed by load bearing, generally vertical webs 8 and 9 respectively which interconnect the transverse frame member 1 and the next rearmost transverse frame member 10. The two load bearing webs 8 and 9 are themselves interconnected at intermediate points along their lengths by a suspension mounting member 11 which is of generally U-shaped cross-section.

Each of the wheel arches also includes non-load bearing generally horizontal portions 12 and 13 respectively.

Parts of a particular vehicle suspension are shown in broken lines, in order to faciliate an understanding of the present invention, this suspension being described and shown in our copending application Ser. No. 171,712 filed Aug. 13, 1971.

The suspension comprises two leading arms 14 and 15 which have their trailing ends pivotally mounted at 16, and 17 respectively to the transverse member 10. Their leading ends carry a rigid axle 18 and horizontal platforms 19 and 20 respectively upon which two air springs 21 and 22 are mounted.

The air springs 21 and 22 are secured at their upper ends to the underside of the suspension mounting member 11 so that suspension loads are transmitted to the sprung mass of the vehicle through the member 11 and the wheel arch portions 8 and 9.

FIG. 2

Figure 2:
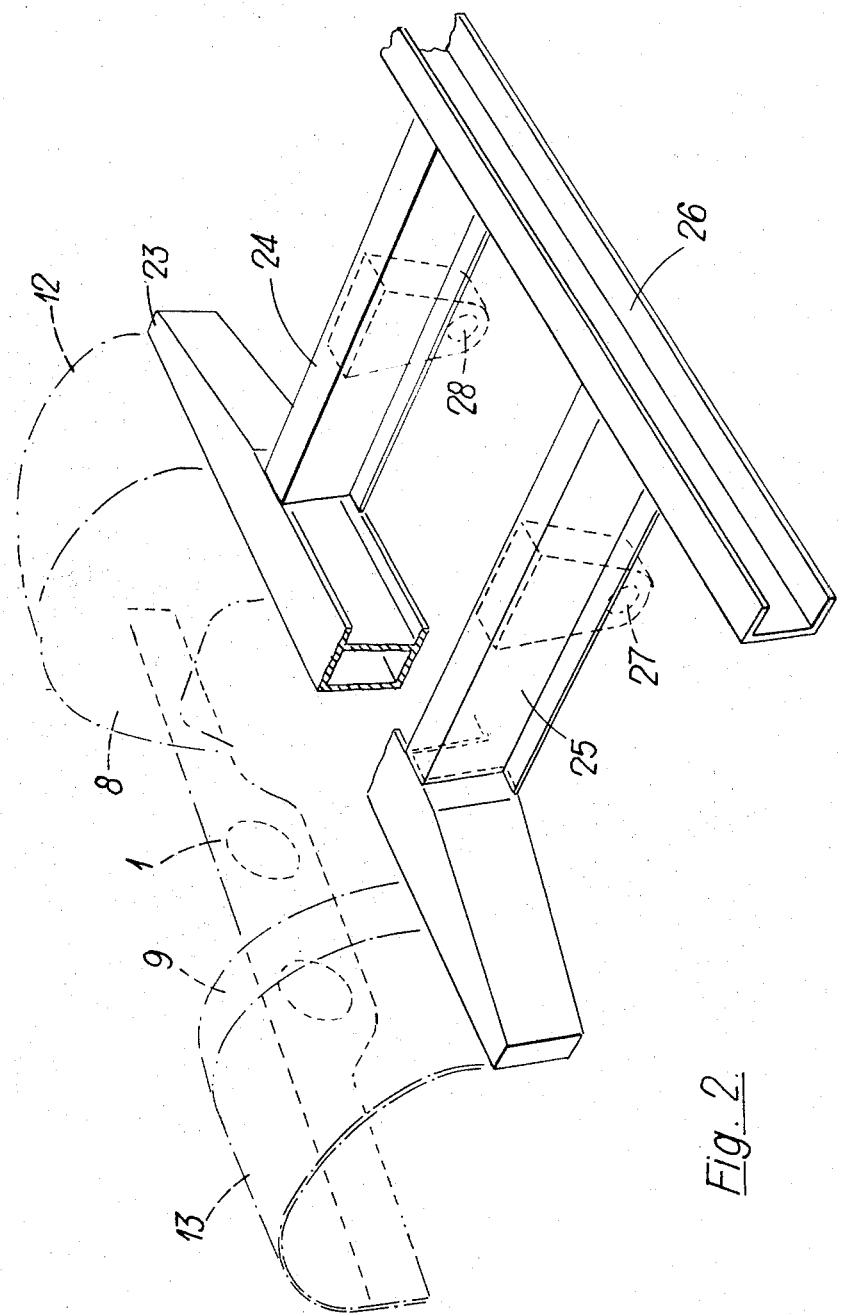
FIG. 2 is a view similar to FIG. 1, but taken in the opposite direction, of a second underframe constructed according to the present invention.
Figure 3:
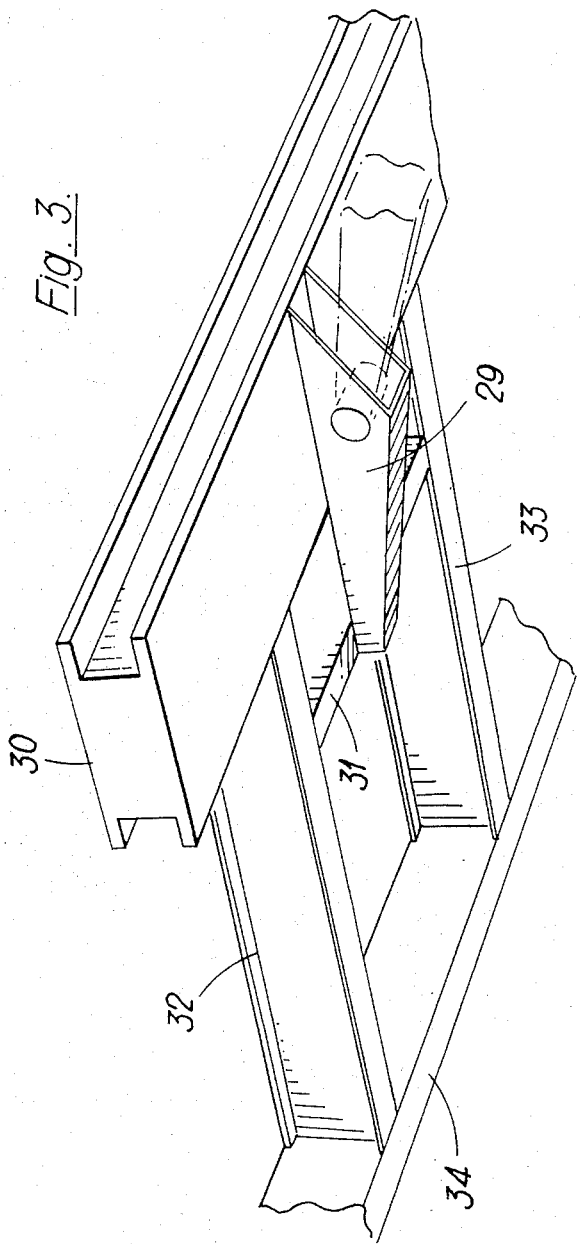
FIG. 3 is a perspective diagrammatic view of another part of the underframe shown in FIG. 2.

The embodiment shown in FIG. 2 is basically similar to the embodiment of the invention shown in FIG. 1 but in this latter embodiment the transverse frame member 10 has been replaced by a box section transverse frame member 23 which extends between the trailing ends of the two stressed wheel arches 8 and 9. Furthermore in this second embodiment the wheel arches 8 and 9 do not extend rearwardly from their trailing ends.

The box section transverse member 23 is designed to transmit stresses imposed on the wheel arches 8 and 9 into the sides of the vehicle body, instead of having all suspension stresses taken up in the underframe itself. In this connection it should be mentioned that although the transverse frame member 23 has been selected to transmit these loads it would have been possible to construct one of the other transverse frame members of the underframe to serve the same purpose.

Extending rearwardly from the transverse frame member 23 are two top-hat section longitudinal frame members 24 and 25 which at their trailing ends are secured to a further transverse frame member 26 which is of U-shaped cross-section.

Two mounting points 27 and 28 for the vehicle suspension are carried by the frame members 24 and 25.

The mounting points 27 and 28 are designed to have the trailing ends of two leading suspension arms pivotally connected to them, the leading ends of the suspension arms being secured to the front axle 18 of the vehicle as in the arrangement shown in FIG. 1.

FIG. 3

This figure diagrammatically illustrates the mounting for the rear suspension of the vehicle.

The rear suspension includes a V-frame which has its leading end, ie. its apex, pivotally connected to a mounting 29, the trailing ends of the two arms of the V-frame serving as platforms for two air springs which are located between its ends and the underside of the underframe of the vehicle body. The rear axle of the vehicle is secured to intermediate points along the lengths of the two arms of the V-frame. This suspension arrangement is described in more detail in our copending application Ser. No. 171,712 filed Aug. 13, 1971.

The mounting 29 has its leading end connected to the transverse frame member 30 which is of box section and is designed to transmit suspension loads to the sides of the motor vehicle body. The trailing end of the mounting 29 is connected to a further transverse member 31, which is of U-shaped cross-section and which is supported between two longitudinal frame members 32 and 33 which have their leading ends connected to the transverse frame member 30 and their trailing ends to another transverse frame member 34.

Thus, as with the mounting for the front suspension shown in FIG. 2, the mounting for the rear suspension is also designed to transmit suspension loads, eg. braking loads, to the body sides.

With this arrangement of transferring the loads into the body sides it is possible to make the vehicle body as a whole of lighter construction than would be the case if the underframe were designed to absorb all suspension loads.

I claim:

1. An integral motor vehicle body in which the underframe is designed to transmit loads into the body sides, i.e., the loads are not taken up entirely in the underframe, having a vehicle suspension arrangement including:
   a. an axle connected to the sprung mass of a vehicle by two suspension elements;
   b. each of the two suspension elements connected, respectively, to one of two wheel arches of the vehicle body, each wheel arch being adapted to transmit suspension loads into the body sides of the vehicle,
   c. each wheel arch comprising a web having a substantially vertical portion extending longitudinally of the vehicle and connected at its ends to two transverse frame members of the vehicle body, the two substantially vertical wheel arch portions being interconnected by a suspension mounting member at intermediate points along their lengths.

2. An integral motor vehicle body as claimed in claim 1 in which each web is connected to the said transverse members by plate joints.

3. An integral motor vehicle body as claimed in claim 1 in which the wheel arch also includes a substantially horizontal portion which is non-load bearing.

4. An integral motor vehicle body as claimed in claim 1 in which each of the suspension elements comprises an air spring.

5. An integral motor vehicle body as claimed in claim 1 in which one of said transverse frame members is a transverse box sectioned member extending across the trailing ends of the wheel arches so that loads applied to the wheel arches by the axle are adapted to be transmitted by the box sectional transverse member to the sides of the vehicle body.

6. An integral motor vehicle body as claimed in claim 5 including:
   a. two top-hat section frame members extending rearwardly from the said box sectioned member, each top-hat section member carrying a mounting point, each mounting point adapted to receive and carry the trailing end of two leading suspension arms which have their front ends connected to the axle.

* * * * *